United States Patent
Middlemass et al.

(10) Patent No.: US 8,134,132 B2
(45) Date of Patent: Mar. 13, 2012

(54) EXPOSURE DEVICE HAVING AN ARRAY OF LIGHT EMITTING DIODES

(75) Inventors: Kirk A. Middlemass, Winchester Center, CT (US); Todd J. Hallock, Thomaston, CT (US); James E. Swope, Goshen, CT (US); Gary A. Zubricky, West Seneca, NY (US)

(73) Assignee: Dymax Corporation, Torrington, CT (US)

( * ) Notice: Subject to any disclaimer, the term of this patent is extended or adjusted under 35 U.S.C. 154(b) by 29 days.

(21) Appl. No.: 12/769,594

(22) Filed: Apr. 28, 2010

(65) Prior Publication Data

US 2011/0268888 A1    Nov. 3, 2011

(51) Int. Cl.
*G21K 1/00* (2006.01)

(52) U.S. Cl. ......... 250/455.11; 250/453.11; 250/454.11; 250/504 R; 362/551; 362/554; 362/555; 362/556; 362/558; 359/618

(58) Field of Classification Search .............. 250/453.11–455.11, 492.1, 493.1, 250/504 R; 362/551, 554, 555, 556, 558; 359/618
See application file for complete search history.

(56) References Cited

U.S. PATENT DOCUMENTS

| | | | | |
|---|---|---|---|---|
| 4,677,531 A * | 6/1987 | Szeles | ........................... | 362/554 |
| 4,948,214 A | 8/1990 | Hamblen | ........................ | 350/413 |
| 5,217,290 A * | 6/1993 | Windross | ........................ | 362/554 |
| 5,222,794 A * | 6/1993 | Windross | ........................ | 362/554 |
| 5,803,575 A * | 9/1998 | Ansems et al. | ............... | 362/554 |
| 5,854,865 A | 12/1998 | Goldberg | ........................ | 385/31 |
| 6,645,230 B2 | 11/2003 | Whitehurst | ..................... | 607/88 |
| 6,784,603 B2 * | 8/2004 | Pelka et al. | .................... | 313/113 |
| 6,880,954 B2 | 4/2005 | Ollett et al. | .................... | 362/245 |
| 6,956,701 B1 * | 10/2005 | Peterson et al. | ............. | 359/618 |
| 7,031,063 B2 * | 4/2006 | Peterson et al. | ............. | 359/618 |
| 7,134,768 B2 | 11/2006 | Suzuki | .......................... | 362/241 |
| 7,189,983 B2 * | 3/2007 | Aguirre et al. | ............ | 250/504 R |
| 7,194,185 B2 | 3/2007 | Watanabe | ...................... | 385/146 |
| 7,218,830 B2 * | 5/2007 | Iimura | .......................... | 385/146 |
| 7,273,369 B2 | 9/2007 | Rosenblood et al. | ........... | 433/29 |
| 7,470,921 B2 | 12/2008 | Custer | ........................... | 250/504 |
| 7,628,523 B2 * | 12/2009 | Sakurada | ...................... | 362/553 |
| 7,631,999 B2 * | 12/2009 | Yoneda et al. | ................ | 362/554 |
| 7,717,578 B2 * | 5/2010 | Drazic | ............................ | 362/19 |
| 7,929,214 B2 * | 4/2011 | Teijido et al. | ................. | 359/629 |
| 2002/0051367 A1 | 5/2002 | Hooker et al. | ................ | 362/551 |
| 2004/0090794 A1 * | 5/2004 | Ollett et al. | .................... | 362/555 |
| 2005/0116179 A1 * | 6/2005 | Aguirre et al. | ............. | 250/492.1 |
| 2006/0002101 A1 * | 1/2006 | Wheatley et al. | ............... | 362/84 |
| 2006/0002131 A1 * | 1/2006 | Schultz et al. | ................ | 362/551 |
| 2007/0058389 A1 * | 3/2007 | Brukilacchio | ................ | 362/555 |

(Continued)

FOREIGN PATENT DOCUMENTS

WO    WO 97/21124    6/1997

(Continued)

*Primary Examiner* — Michael Maskell
(74) *Attorney, Agent, or Firm* — Roberts & Roberts, LLP

(57) ABSTRACT

A device and method for exposing light sensitive substrates to a concentrated light source. The device is suitable for curing substances such as photosensitive sensitive inks, adhesives, and photographic elements. Ultraviolet or visible light is emitted from an array of LED's, and then directed by an array of light guides to a light concentrator having a light input region along its length. The light is then concentrated and emitted from a light output region along the length of the light concentrator to a photosensitive target to be exposed.

19 Claims, 12 Drawing Sheets

U.S. PATENT DOCUMENTS

| | | | |
|---|---|---|---|
| 2007/0184141 A1 | 8/2007 | Custer | 425/174 |
| 2008/0310181 A1* | 12/2008 | Gurevich et al. | 362/554 |
| 2009/0059614 A1* | 3/2009 | Henson et al. | 362/553 |
| 2009/0160923 A1* | 6/2009 | Custer | 347/102 |
| 2010/0052547 A1 | 3/2010 | Delnoig | 315/152 |
| 2010/0302544 A1* | 12/2010 | Duer | 356/432 |

FOREIGN PATENT DOCUMENTS

WO    WO 2008/065606    6/2008

* cited by examiner

EXPOSURE DEVICE HAVING AN ARRAY OF LIGHT EMITTING DIODES

BACKGROUND OF THE INVENTION

1. Field of the Invention

This invention generally relates to a device and method for exposing substrates to a concentrated light source. More particularly, the invention pertains to a light-emitting diode (LED) device for curing substances such as photosensitive sensitive inks, adhesives, and photographic elements. Ultraviolet or visible light is emitted from an array of LED's, and then directed by an array of light guides to a light concentrator having a light input region along its length. The light is then concentrated and emitted from a light output region along the length of the light concentrator to a photosensitive target to be exposed.

2. Description of the Related Art

Electromagnetic energy, particularly energy in an ultraviolet (UV) light frequency range has been found to speed curing of some substances, including fluids such as inks, coatings, and adhesives. Many of these fluids include photoinitiators that convert monomers in the fluids into polymers to solidify the monomer material when the fluids are exposed to UV light. Conventional apparatus for curing substances using UV light sources include lamps and/or LEDs that produce light in a UV frequency range selected to optimize curing times. An LED is a type of electronic semiconductor device that emits light when an electric current passes through it. The light curable photosensitive compositions are then used in the manufacture of electronic components, medical equipment, and other industrial products. In the past, the compositions found in such environments have been cured using high pressure arc lamps to flood the UV sensitive material with UV light. While arc lamp technology is widely used, such technology has several disadvantages. One disadvantage is the relatively short life span of the bulbs used in the conventional arc lamp configured curing sources. Furthermore, the arc bulb degrades nonlinearly during its lifetime. As a result, conventional arc lamp photocuring systems often require monitoring and adjusting the output power as the bulb degrades. Further, arc lamps are typically powered-on even during stand-by periods because they require cumbersome warm-up and cool-down cycles. As a result, much of the life of the conventional bulbs may be lost during these stand-by periods. Another disadvantage is the broad spectrum of the light radiated by the arc lamps. An arc lamp radiates UV, visible, and infrared (IR) light. Typically, UV band pass filters transmit the portion of the UV spectrum required for curing a particular photosensitive material. Heat-rejecting IR filters are usually employed to prevent heating of the cure surface. Because the IR radiation creates a very hot lamp housing, transmission optics near the lamp housing must be made of temperature resistant, UV-transmissive materials. LED's often are substituted for such arc lamps.

U.S. Pat. No. 7,273,369 shows an optical fiber light module which includes a hollow housing including at least one heat sink, and two or more light sources such as LED arrays. U.S. Pat. No. 4,948,214 shows a lens array for optical scanning devices including a light guide and microlens device for LED imaging. U.S. Pat. No. 6,645,230 shows a structure including an array of LEDs mounted on or within a housing. U.S. Pat. No. 7,218,830 shows a flat panel light guide containing several light-guide members and at least one point light source, such as an LED or array of LEDs. U.S. Pat. No. 7,134,768 relates to an LED lamp with light guide, for use in vehicle lamps, traffic signal lamps, video games, and other lighting applications. The structure includes a plurality of LEDs whose light is collimated via a light guide, and inwardly reflected via multiple reflective surfaces within a housing. U.S. Pat. No. 7,194,185 relates to electronic devices having a colored light guide protruding through a cover. The light guide is illuminated by two LEDs below the cover. The two LEDs are in contact with a second light guide, below the cover, which is capable of blending the light colors from the two LEDs. U.S. Pat. No. 6,880,954 shows a method and apparatus for curing photosensitive materials using LEDs and an optical concentrator to generate high optical power intensities. This reference uses both collimated light LEDs and an optical element between the LEDs and an optical fiber. It has been determined that a problem with these aperture arrangements is non-uniformity of light intensity.

The introduction of light emitting diodes has created new alternatives for curing some light sensitive materials. LED technology offers several advantages over the conventional arc lamp technology. Typical LEDs last between 20,000 and 50,000 hours, providing a significant lifespan improvement over arc lamp technology. LEDs also do not emit significant amounts of IR radiation. As an added benefit, the reduced heat generation allows the use of economical light transmitting polymers for optics.

LED sources can also be turned on and off as required because LEDs do not require the warm-up and cool-down periods common in arc lamp systems. Some LED curing systems may implement driver circuits to control the current supplied to the LEDs. These circuits typically use a closed-loop system to monitor and control the output power of the LEDs, by controlling the drive current, to provide a stable and reliable UV/violet source. These circuits may also define different curing cycles for different photosensitive materials, such as emitting a specific output power for a specific length of time.

Unfortunately, conventional LED sources and LED systems have relatively low output power compared to traditional arc lamps. While the lower output power LED photocuring systems have proven to be sufficient for some dental applications, many commercial and industrial light sensitive materials require higher output powers to quickly cure the materials in a fast production environment.

The present invention provides an improved light guide exposure device having improved uniformity and amount of light intensity. The illumination device comprises an optical light concentrator which is substantially transparent to light in the ultraviolet and/or visible region. The light concentrator has a light input region and a light output region along its length. Several light emitting diodes are positioned, one at each light input ends of a series of light guides. The light output end of each of the light guides abut the light concentrator along its length at the light input region, thus allowing concentrated light to be emitted along the length of the light output region of the concentrator such that the concentrated light is directed toward a photosensitive composition disposed on a substrate.

SUMMARY OF THE INVENTION

The invention provides an illumination device for curing a photosensitive composition comprising an optical light concentrator which is substantially transparent to light in the ultraviolet and/or visible region of the electromagnetic spectrum, said light concentrator having a length and a width; said light concentrator having a light input region along its length, and a light output region along its length at a location spaced from the light input region; a plurality of light guides, each light guide having a light input end and a light output end; a plurality of light emitting diodes, one light emitting diode in juxtaposition with a light input end of one of the light guides and capable of emitting light into the light input end of the light guide to which it is juxtaposed; the light output end of each of said light guides abutting the light concentrator along its length at the light input region.

The invention further provides a method for exposing a photosensitive composition which comprises:

i) providing an illumination device for curing a photosensitive composition comprising an optical light concentrator which is substantially transparent to light in the ultraviolet and/or visible region of the electromagnetic spectrum, said light concentrator having a length and a width; said light concentrator having a light input region along its length, and a light output region along its length at a location spaced from the light input region; a plurality of light guides, each light guide having a light input end and a light output end; a plurality of light emitting diodes, one light emitting diode in juxtaposition with a light input end of one of the light guides and capable of emitting light into the light input end of the light guide to which it is juxtaposed; the light output end of each of said light guides abutting the light concentrator along its length at the light input region;

ii) providing a photosensitive composition disposed on a substrate; and then iii) exposing the photosensitive composition by directing light in the ultraviolet and/or visible region of the electromagnetic spectrum from the light output region of the light concentrator to the photosensitive composition.

DETAILED DESCRIPTION OF THE INVENTION

Figure 1:
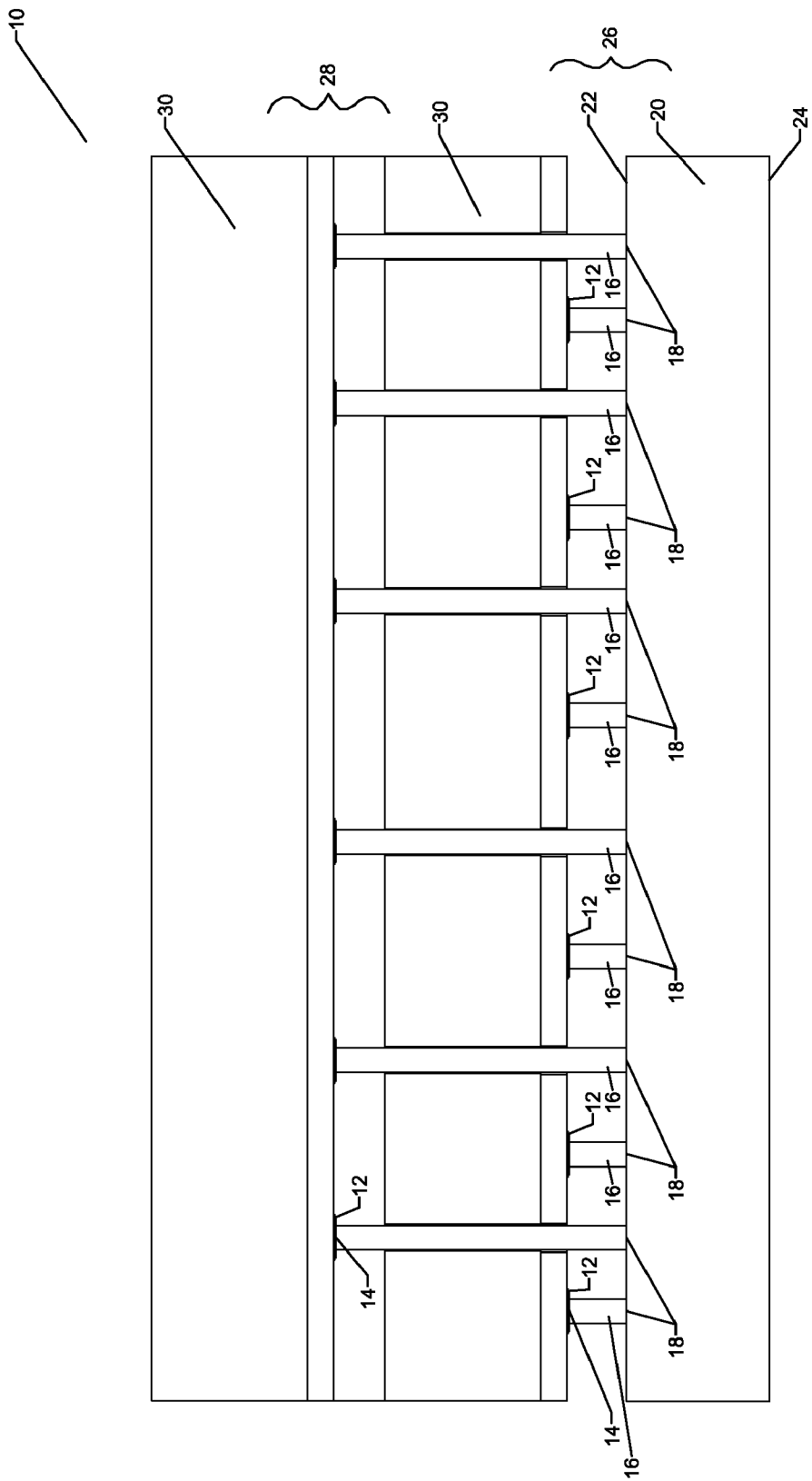
FIG. 1 shows an illumination device according to the invention having upper and lower arrays of light emitting diodes connected by light guides of varying length which culminate at a light concentrator.

FIG. 1 shows one embodiment of an illumination device 10 for curing a photosensitive composition according to the invention. It has an array of light emitting diodes 12 and a corresponding array of light guides 16. Each light guide 16 has a light input end 14 and a light output end 18. Each light emitting diode 12 is in juxtaposition with a single light guide 16 at a light input end 14 of one light guide 16 such that each of the light emitting diodes 12 are positioned for emitting light into the light input end 14 of the light guide 16 to which it is juxtaposed.

The illumination device also has an optical light concentrator 20 which is substantially transparent to light in the ultraviolet and/or visible region of the electromagnetic spectrum. The light concentrator 20 has a length and a width, a light input region 22 along its length, and a light output region 24 along its length at a location spaced from the light input region. The light output end 18 of each of the light guides 16 abuts the light concentrator 20 along its length at the light input region 22. For purposes of this invention, the term "abut" means that the light output ends 18 of light guides 16 either touch the light input region 22 of the light concentrator 20 or the light output ends 18 of light guides 16 either touch the light input region 22 of the light concentrator 20 are within about 0.010 inches of each other.

The concentrated light from all of the light emitting diodes then exits from the light concentrator 20 along the light output region 24. In one embodiment of the invention the illumination device may have a single array 26 of light emitting diode and light guide combinations. In another embodiment of the invention the illumination device may have more than one array 28 of light emitting diode and light guide combinations arranged such that the light emitting diodes arranged in a array 26 are at a first distance from the light concentrator and the light emitting diodes in array 28 are at a second distance from the light concentrator in which second distance is different from the first distance. In a preferred embodiment, the illumination device further comprising one or more heat dissipating devices 30 positioned near the light emitting diodes and being capable of conducting heat from the light emitting diodes away from the light concentrator 20.

The light emitting diodes are capable of emitting one or more wavelengths of ultraviolet light, visible light, or both. In one embodiment the light emitting diodes are capable of emitting light in the range of from about 200 nm to about 800 nm. In another embodiment the light emitting diodes are capable of emitting light in the range of from about 250 nm to about 450 nm.

Figure 2:
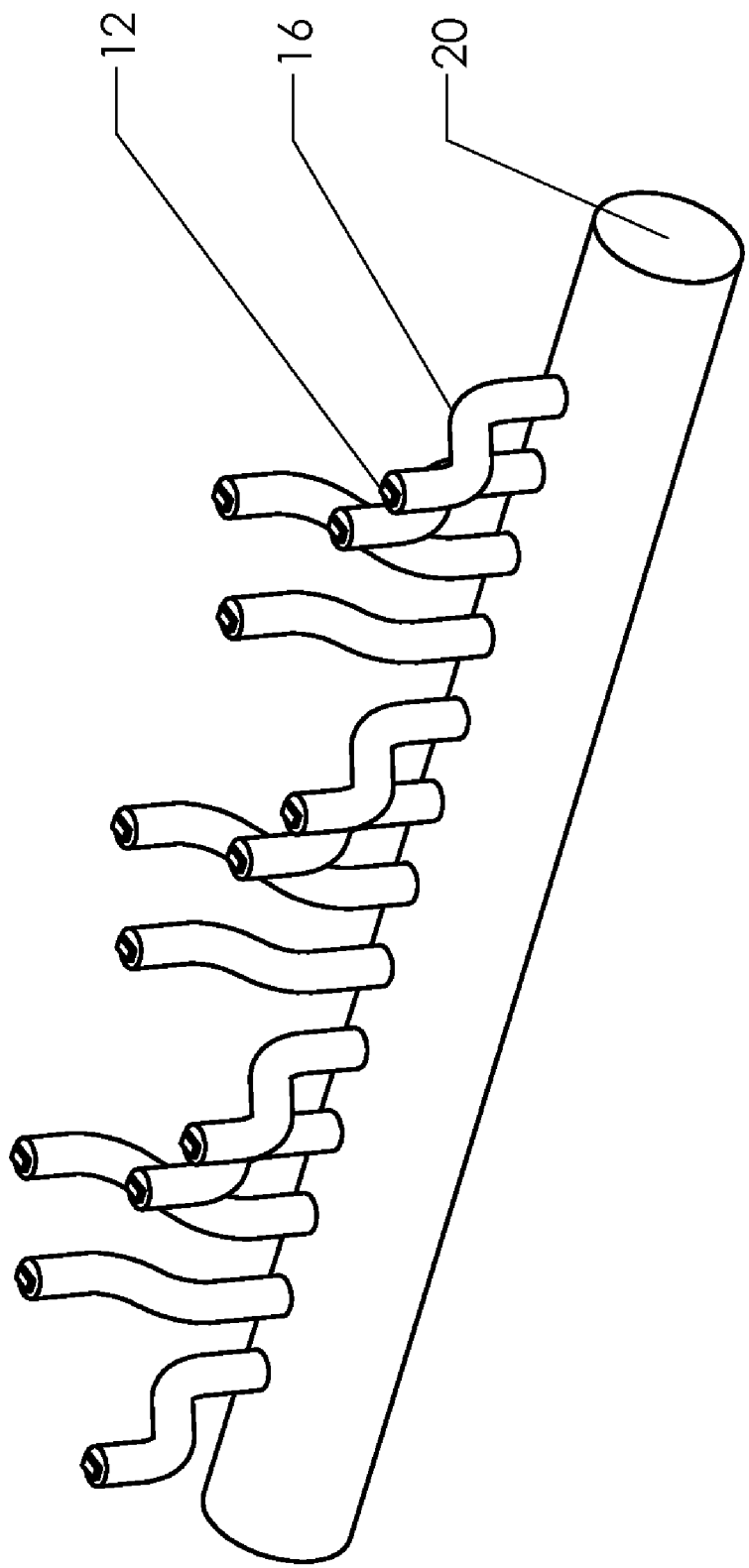
FIG. 2 shows another embodiment of the invention wherein the light concentrator has a substantially circular cross-section and the light guides are curved.
Figure 3:
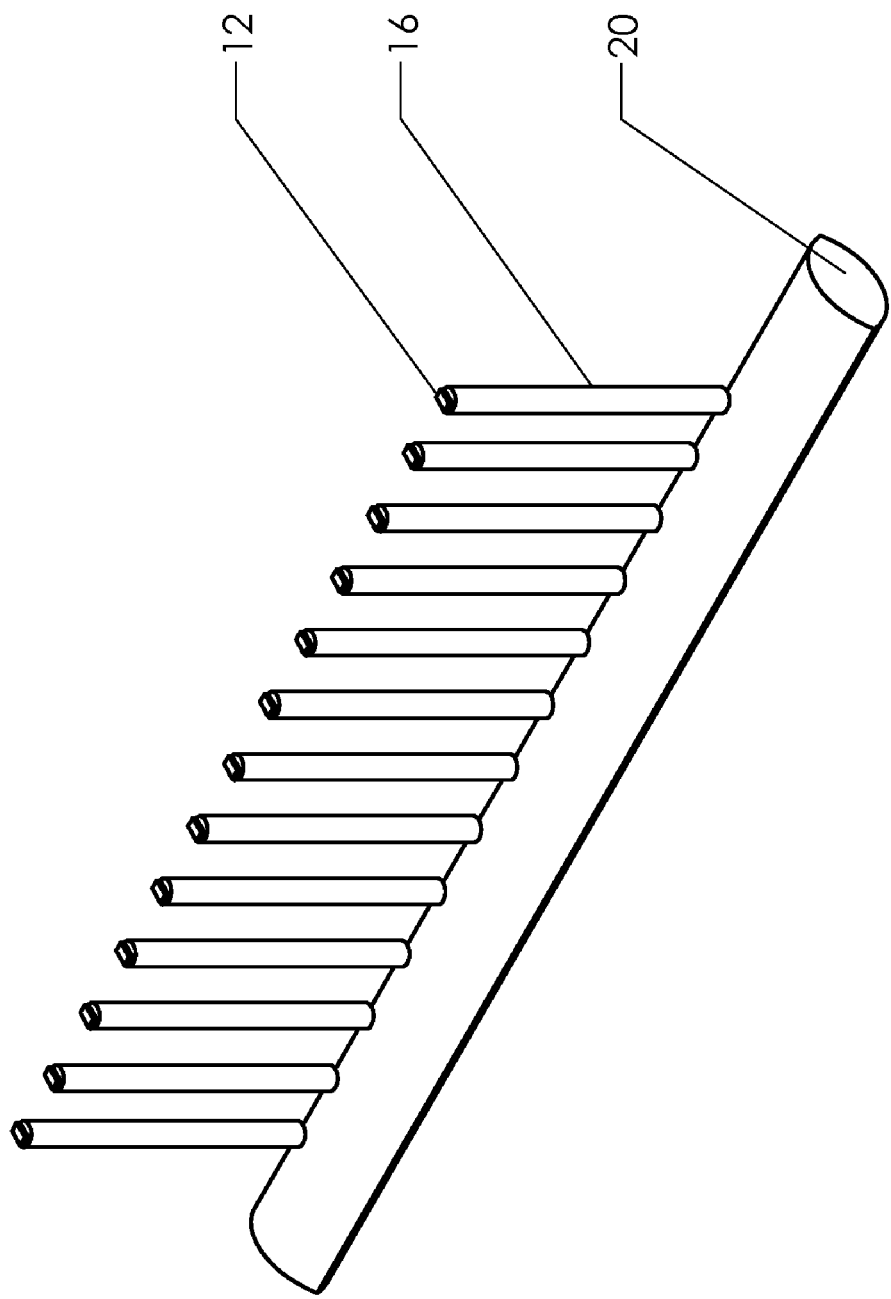
FIG. 3 shows another embodiment of the invention wherein the light concentrator has a substantially oval cross-section and the light guides are straight and equally spaced from one another.
Figure 4:
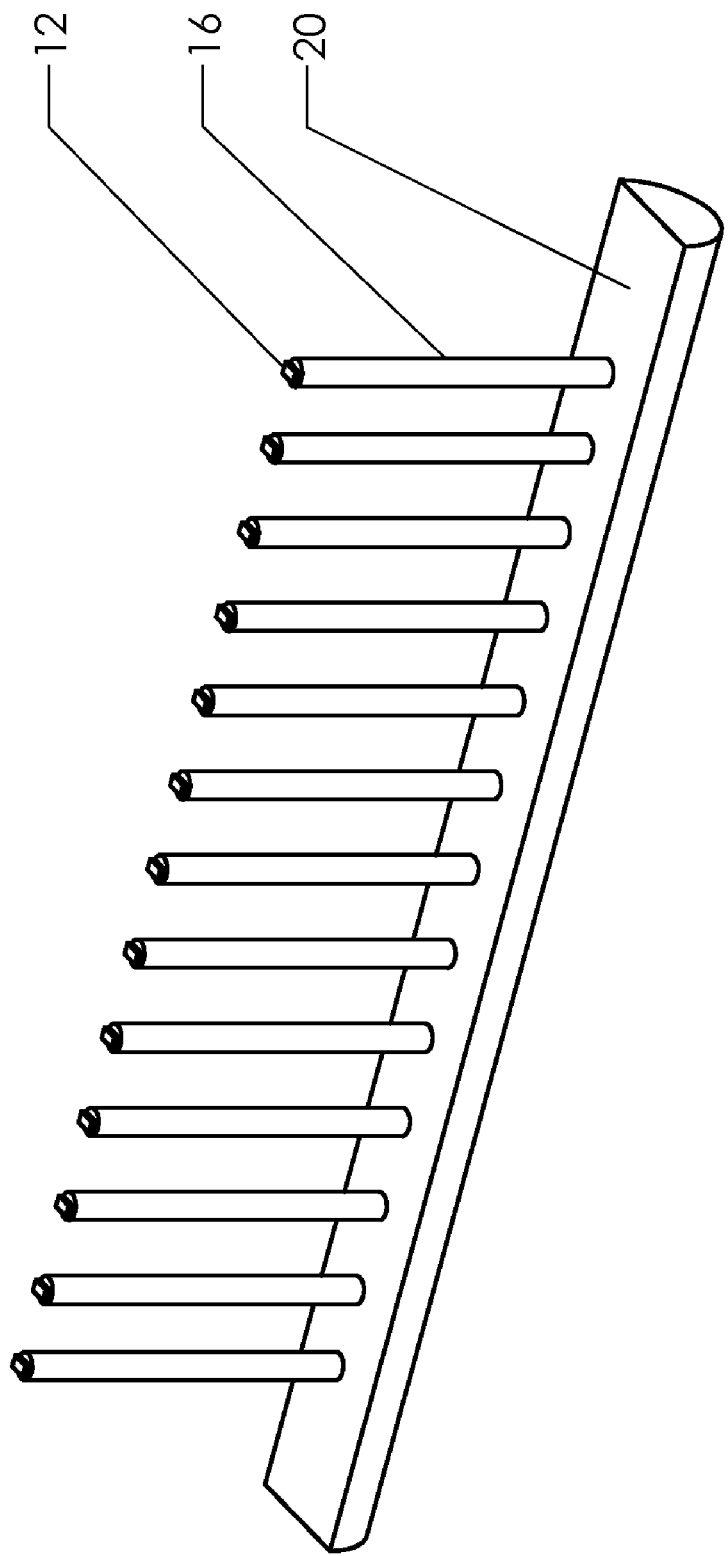
FIG. 4 shows another embodiment of the invention wherein the light concentrator has a substantially semi-circular cross-section and the light guides are straight and equally spaced from one another.

FIG. 2 shows another embodiment of the invention wherein the light concentrator 20 has a substantially circular cross-section. In this embodiment, the light guides 16 are curved. FIG. 3 shows another embodiment of the invention wherein the light concentrator has a substantially oval cross-section and the light guides are straight and equally spaced from one another. FIG. 4 shows another embodiment of the invention wherein the light concentrator has a substantially semi-circular cross-section and the light guides are straight and equally spaced from one another.

Figure 5:
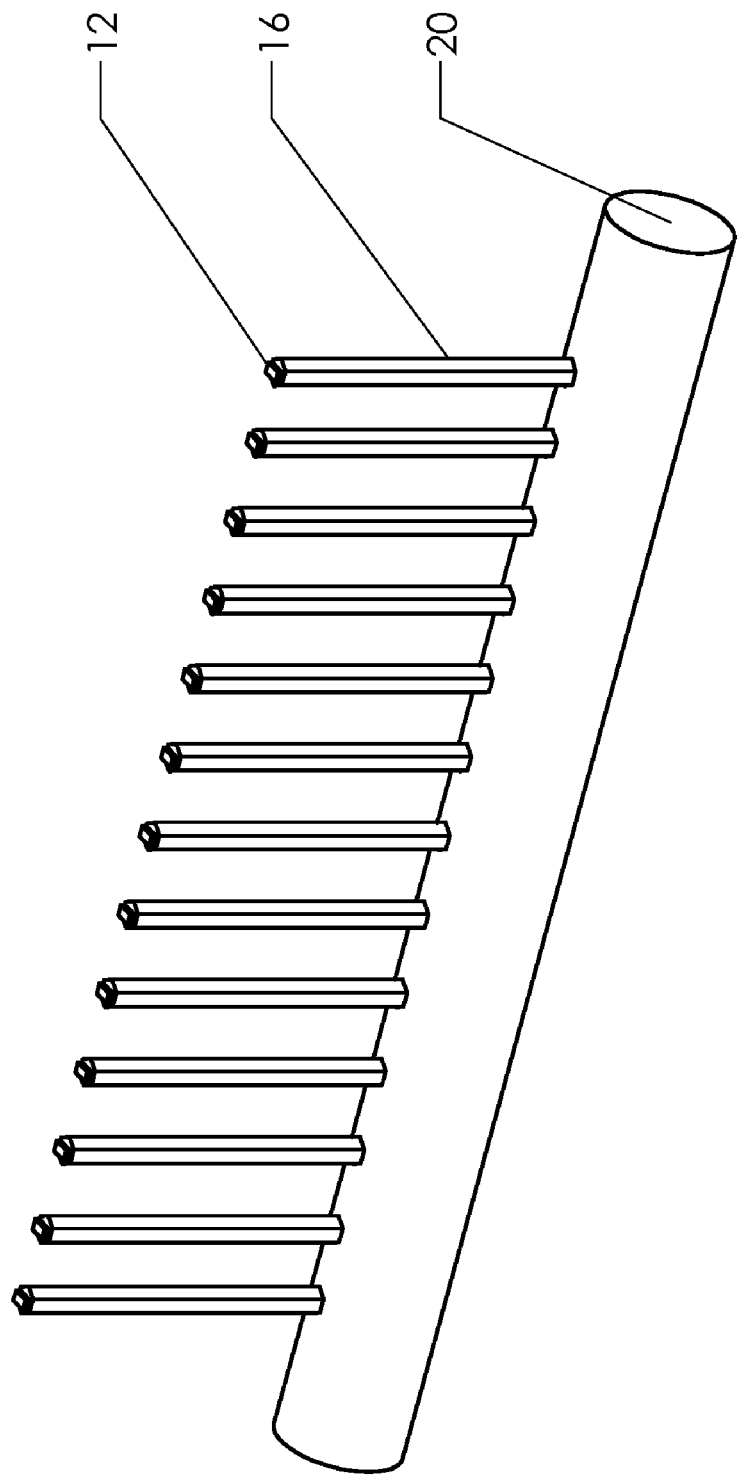
FIG. 5 shows another embodiment of the invention wherein the light guides are hexagonal.
Figure 6:
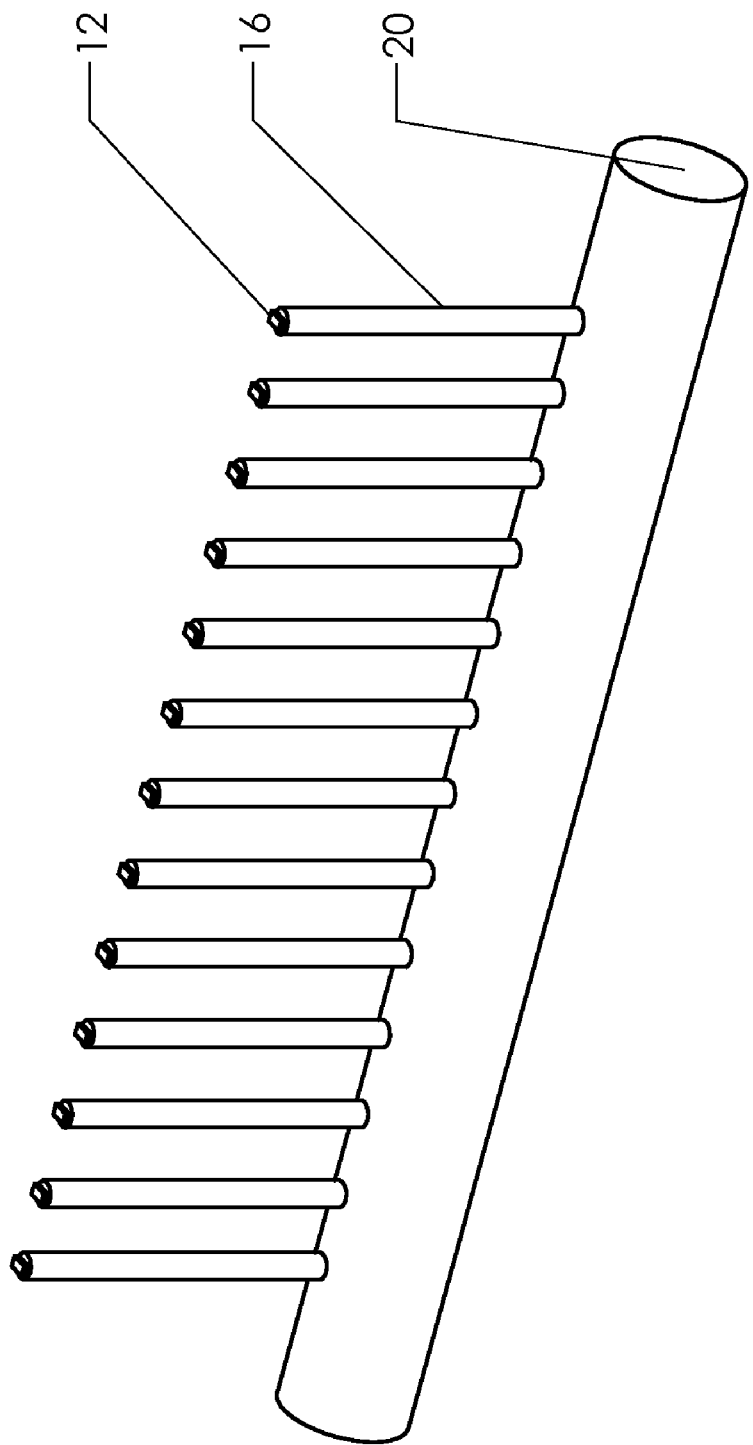
FIG. 6 shows another embodiment of the invention wherein the light guides and the light concentrator have a circular cross-section and the light guides are equally spaced from one another.
Figure 7:
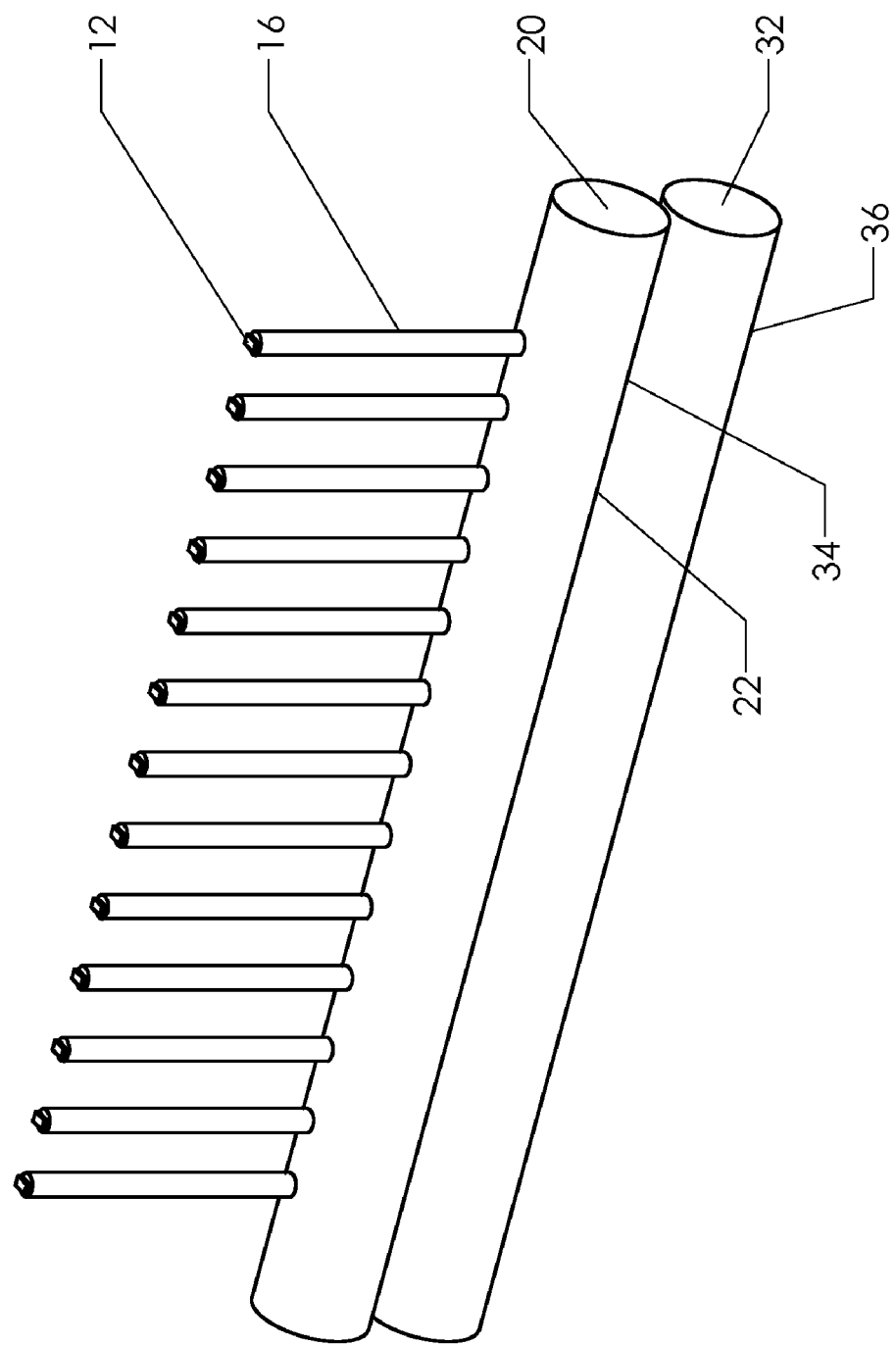
FIG. 7 shows another embodiment of the invention having two light concentrators.
Figure 8:
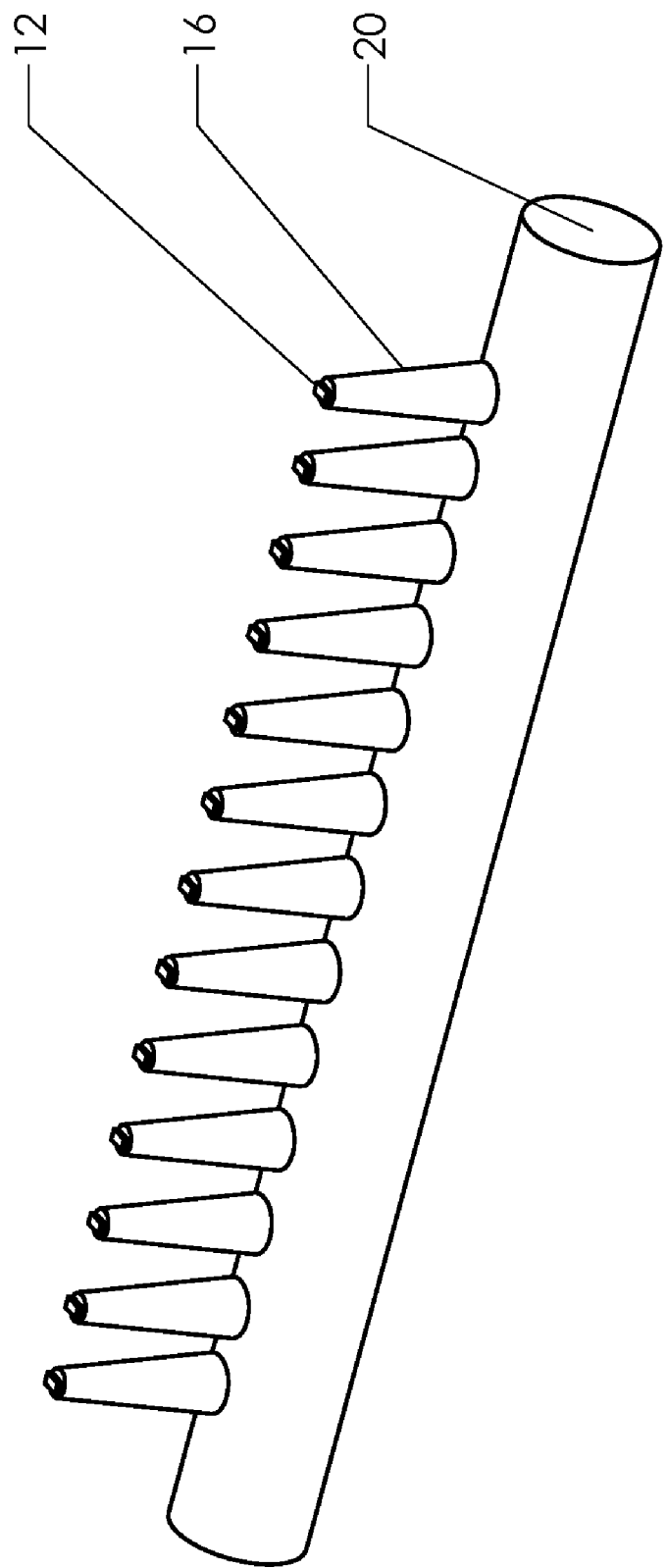
FIG. 8 shows another embodiment of the invention wherein the light guides are tapered in a cone shape.
Figure 9:
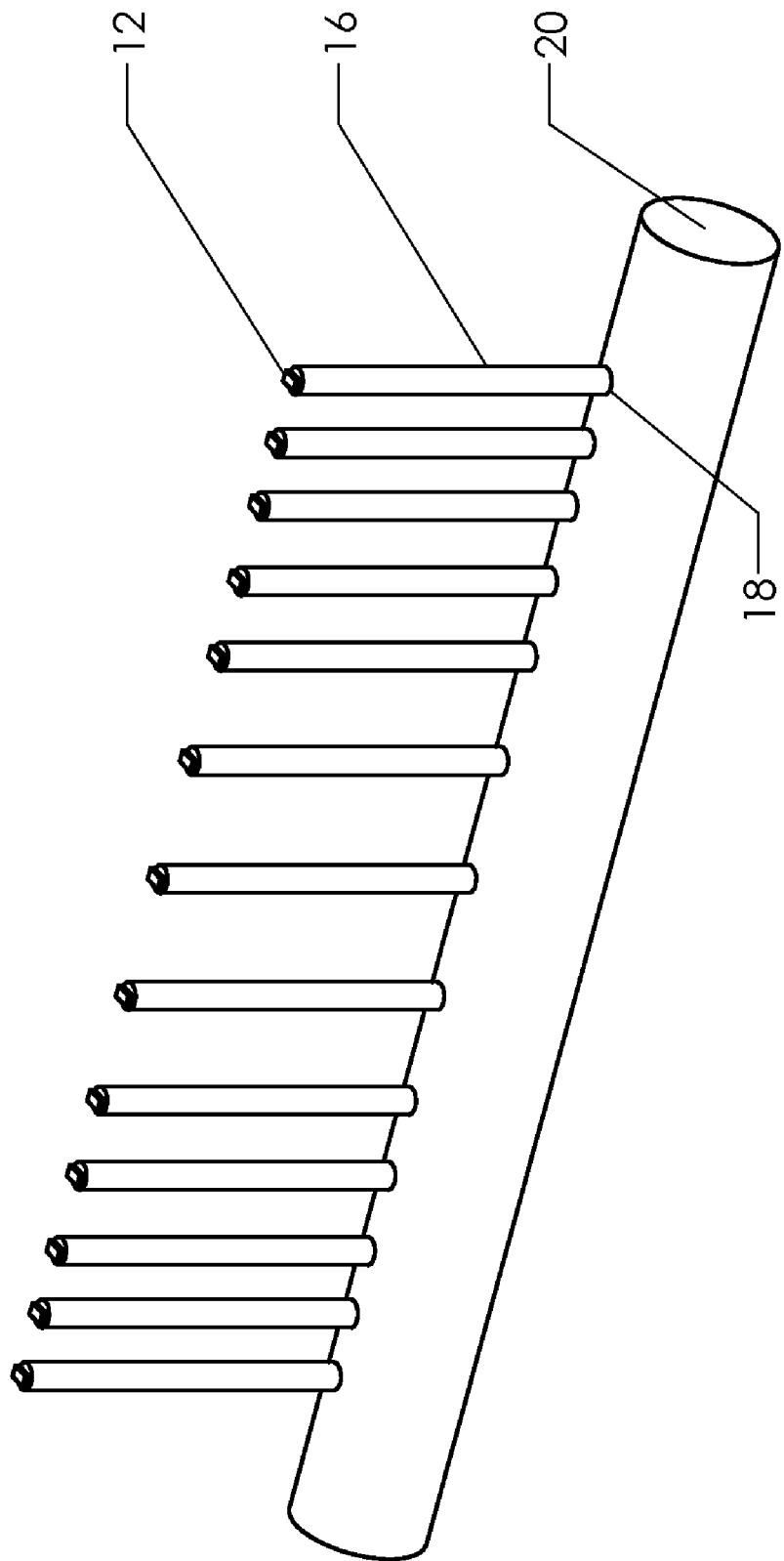
FIG. 9 shows another embodiment of the invention wherein the light output ends of the light guides are positioned along the light input region of the light concentrator such that the light output ends are more closely spaced apart at end portions of the light concentrator than at a central portion of the light concentrator.
Figure 10:
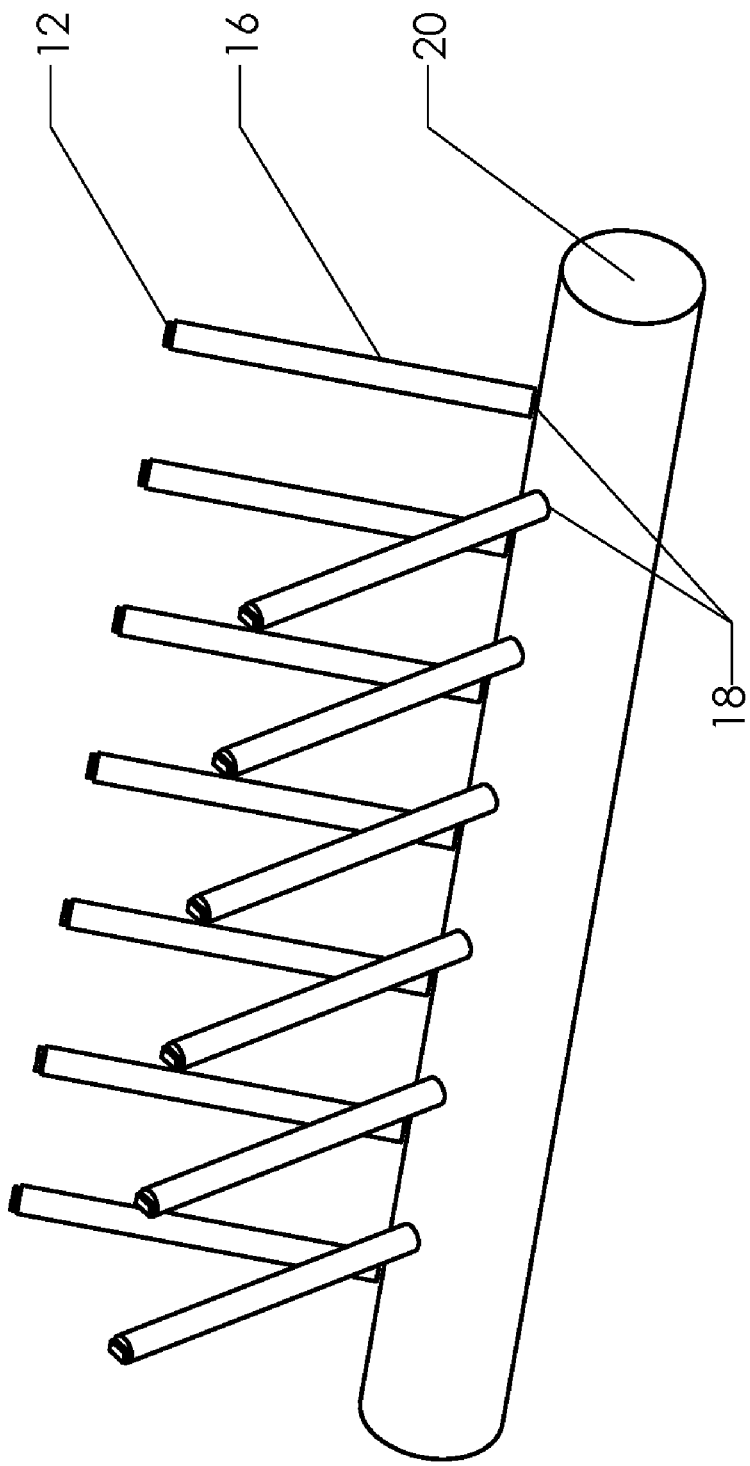
FIG. 10 shows another embodiment of the invention wherein the light output ends of the light guides are positioned at various angles along the light input region of the light concentrator.
Figure 11:
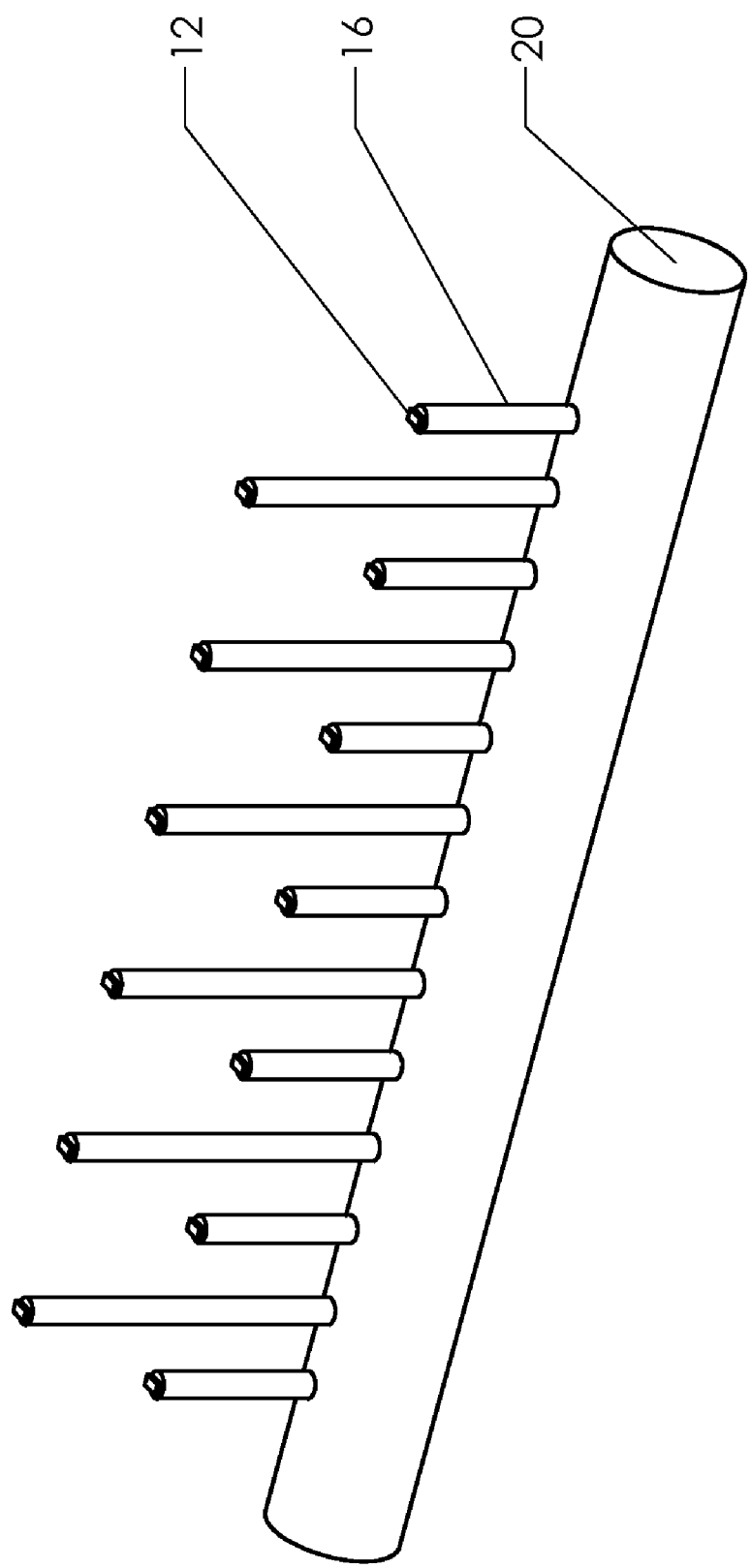
FIG. 11 shows another embodiment of the invention wherein the light guides have various heights.
Figure 12:
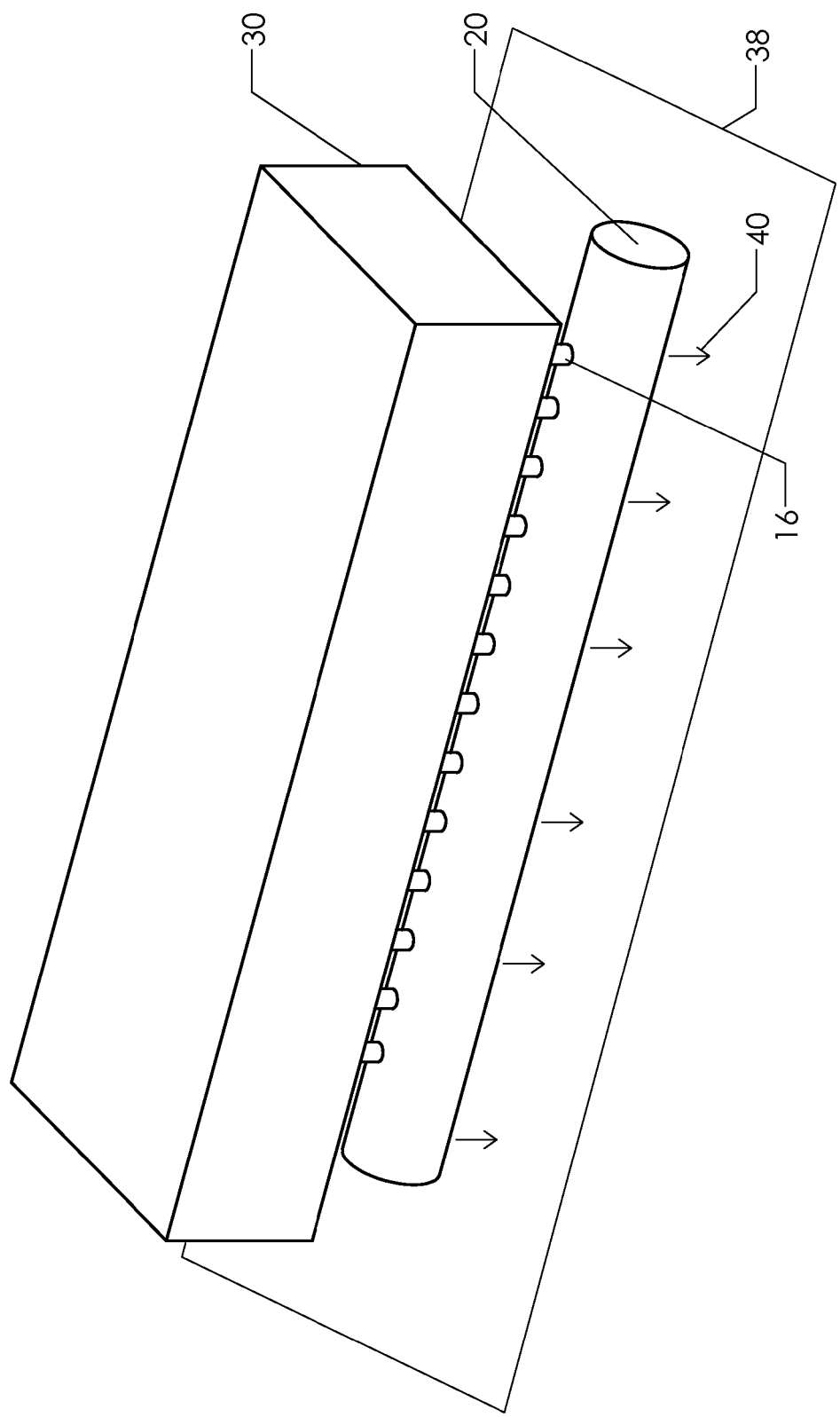
FIG. 12 shows an embodiment of the invention wherein the light guides are positioned adjacent to a heat dissipater.

Preferably the light concentrator 20 comprises a rod having a circular, square, hexagonal, or oval cross-section. Preferably the light guides 16 comprise a rod having a circular, square, hexagonal, or oval cross-section. FIG. 5 shows another embodiment of the invention wherein the light guides 16 are hexagonal in cross-section. FIG. 6 shows another embodiment of the invention wherein the light guides 16 and the light concentrator 20 have a circular cross-section and the light guides 16 are equally spaced from one another. In another embodiment of the invention as shown in FIG. 7, the illumination device 1 further comprises a second light concentrator 32 which is substantially transparent to light in the ultraviolet and/or visible region of the electromagnetic spectrum. The second light concentrator 32 also has a length and a width. The second light concentrator 32 has a light input region 34 along its length and a light output region 36 along its length at a location spaced from the light input region. The second light concentrator 32 is positioned such that the light input region 34 of the second light concentrator 32 is positioned along the length of the light output region 22 of the concentrator 20. FIG. 8 shows another embodiment of the invention wherein the light guides 16 have a tapered cone shaped cross-section having a broad cone portion and a narrow cone portion, and wherein the light output ends 18 of the light guides 16 are abutting along their broad cone portion at the light concentrator. FIG. 9 shows another embodiment of the invention wherein the light output ends 18 of the light guides 16 are positioned along the light input region of the light concentrator such that light output ends 18 of the light guides are more closely spaced apart at end portions of the light concentrator 20 than at a central portion of the light concentrator 20. Preferably the light emitting diodes are selected, and the light guides are positioned along the light input region of the light concentrator such that the light intensity output along the light output region of the light concentrator varies along the light output region by about 25% or less, more preferably by about 5% or less. FIG. 10 shows another embodiment of the invention wherein the light output ends 18 of the light guides 16 are positioned at various angles along the light input region of the light concentrator. FIG. 11 shows another embodiment of the invention wherein the light guides 16 have various heights. FIG. 12 shows an embodiment of the invention wherein the light guides 16 are positioned adjacent to heat dissipater 30.

In use, one provides the illumination device described above. The device is positioned adjacent to a photosensitive composition disposed on a substrate 38. The photosensitive composition by directing light 40 in the ultraviolet and/or visible region of the electromagnetic spectrum from the light output region of the light concentrator onto the photosensitive composition. In use, the above described light guide exposure device 10 and a photosensitive composition are provided on a substrate 38. UV and/or visible light is directed onto the photosensitive composition from the LED's 12 array, through light guides 16 and concentrator 20, for a sufficient time, and at a sufficient light intensity to cause a change of a condition of the photosensitive composition. The photosensitive composition is suitably a light hardenable adhesive composition, coating composition, encapsulant composition, masking composition, or sealant composition, as are well known in the art. The photosensitive composition non-exclusively includes a polymerizable or crosslinkable material comprising an acrylate, a methacrylate, a cyanoacrylate, an epoxy, or combinations thereof. These may be reactive to ultraviolet light or visible light or both. An operator uses the light guide exposure device by placing a photosensitive composition in an unhardened form on a selected substrate 38. The LEDs remain activated for a predetermined amount of time during which time the photosensitive material is exposed to the UV/visible light to cause the photosensitive composition to undergo a desired physical change.

The photosensitive composition typically comprises a substantially homogeneous fluid comprising an admixture of an organic, free radical polymerizable component and a polymerization initiator. The organic, free radical polymerizable component may be a monomer, oligomer or polymer having at least one and preferably two olefinically unsaturated double bonds. Such are well known in the art. Useful free radical polymerizable components include acrylates and methacrylates. The organic, free radical polymerizable component is present in an amount sufficient to polymerize upon exposure to sufficient actinic radiation. In the preferred embodiment, the organic, free radical polymerizable component is present in the overall photosensitive composition in an amount of from about 1% to about 99% by weight, preferably from about 50% to about 99% based on the non-solvent parts of the overall photosensitive composition. The free radical generating component is preferably present in an amount sufficient to effect polymerization of the polymerizable compound upon exposure to sufficient actinic radiation. The polymerization initiator may comprise from about 0.1% to about 50% of the non-solvent parts of the photosensitive composition, more preferably from about 0.1% to about 10%. Various optional additives may be added to the composition depending on the specific end-use of the radiation-curable composition and other various conditions. Examples of these include thermal polymerization inhibitors, plasticizers, fillers, electrically conductive particles, thermally conductive particles, spacers, colorants, adhesion promoters, surfactants, sensitizers, exposure indicators, and others. The photosensitive composition finds use as an adhesive or a coating composition. In a preferred embodiment of the photosensitive composition has a polymerizable component which is a urethane acrylate and/or methacrylate oligomer and/or an epoxy oligomer in combination with an acrylate monomer and/or an methacrylate monomer, and wherein the polymerization initiator comprises a ketone and/or a phosphine oxide. The photosensitive composition may be prepared by admixing the composition components until a substantially homogenous fluid is formed. The photosensitive composition is then applied as a coating onto a substrate and exposed to sufficient ultraviolet or visible radiation to initiate the polymerization of the polymerizable component. The length of time for exposure is easily determinable by those skilled in the art and depends on the selection of the particular components of the radiation-curable composition. Typically exposure ranges from about 1 second to about 60 seconds, preferably from about 2 seconds to about 30 seconds, and more preferably from about 2 seconds to about 15 seconds. Typical exposure intensities range from about 10 mW/cm$^2$ to about 20 W/cm$^2$, preferably from about 50 mW/cm$^2$ to about 15 W/cm$^2$, and more preferably from about 100 mW/cm$^2$ to about 10 W/cm$^2$.

While the present invention has been particularly shown and described with reference to preferred embodiments, it will be readily appreciated by those of ordinary skill in the art that various changes and modifications may be made without departing from the spirit and scope of the invention. It is intended that the claims be interpreted to cover the disclosed embodiment, those alternatives which have been discussed above and all equivalents thereto.

What is claimed is:

1. An illumination device for curing a photosensitive composition comprising an optical light concentrator which is substantially transparent to light in the ultraviolet and/or visible region of the electromagnetic spectrum, said light concentrator comprising a rod and having a length and a width; said light concentrator having a light input region along its length, and a light output region along its length at a location spaced from the light input region; a plurality of light guides, each light guide having a light input end and a light output end; a plurality of light emitting diodes, one light emitting diode in juxtaposition with a light input end of one of the light guides and capable of emitting light into the light input end of the light guide to which it is juxtaposed; the light output end of each of said light guides abutting the light concentrator along its length at the light input region.

2. The illumination device of claim 1 wherein the plurality of light emitting diodes are arranged in a linear array spaced from and positioned along the length of the light concentrator.

3. The illumination device of claim 1 wherein the plurality of light emitting diodes are arranged in a plurality of linear arrays spaced from and positioned along the length of the light concentrator.

4. The illumination device of claim 3 wherein the plurality of light emitting diodes are arranged in a plurality of linear arrays spaced from and positioned along the length of the light concentrator, wherein each of the plurality of linear arrays is at a different distance from the light concentrator.

5. The illumination device of claim 3 wherein the plurality of light emitting diodes are arranged in a first linear array at a first distance from the light concentrator and a second linear array at a second distance from the light concentrator which second distance is different from the first distance.

6. The illumination device of claim 1 further comprising one or more heat dissipating devices positioned near the light emitting diodes and being capable of conducting heat from the light emitting diodes away from the light concentrator.

7. The illumination device of claim 1 wherein the light emitting diodes are capable of emitting one or more wavelengths of ultraviolet light.

8. The illumination device of claim 1 wherein the light emitting diodes are capable of emitting one or more wavelengths of visible light.

9. The illumination device of claim 1 wherein the light emitting diodes are capable of emitting light in the range of from about 200 nm to about 800 nm.

10. The illumination device of claim 1 wherein the light emitting diodes are capable of emitting light in the range of from about 250 nm to about 450 nm.

11. The illumination device of claim 1 wherein the light concentrator comprises a rod having a circular, square, hexagonal, or oval cross-section.

12. The illumination device of claim 1 wherein the light guides comprise a rod having a circular, square, hexagonal, or oval cross-section.

13. The illumination device of claim 1 wherein the light concentrator comprises a rod having a semi-circular cross-section.

14. The illumination device of claim 1 further comprising a second light concentrator which is substantially transparent to light in the ultraviolet and/or visible region of the electromagnetic spectrum, said second light concentrator comprising a rod and having a length and a width; said second light concentrator having a light input region along its length and a light output region along its length at a location spaced from the light input region, said second light concentrator being positioned such that the light input region of the second light concentrator is positioned along the length of the light output region of another light concentrator.

15. The illumination device of claim 1 wherein the light guides have a tapered cone shaped cross-section having a broad cone portion and a narrow cone portion, and wherein the broad cone portions are at the light output ends of the light guides which abut light input region of the light concentrator.

16. The illumination device of claim 1 wherein the light emitting diodes are selected, and the light guides are positioned along the light input region of the light concentrator such that the light intensity output along the light output region of the light concentrator varies along the light output region by about 25% or less.

17. The illumination device of claim 1 wherein the light emitting diodes are selected, and the light guides are positioned along the light input region of the light concentrator such that the light intensity output along the light output region of the light concentrator varies along the light output region by about 5% or less.

18. The illumination device of claim I wherein the light output ends of the light guides are positioned along the light input region of the light concentrator such that light output ends of the light guides are more closely spaced apart at end portions of the light concentrator than at a central portion of the light concentrator.

19. A method for exposing a photosensitive composition which comprises:
   i) providing an illumination device for curing a photosensitive composition comprising an optical light concentrator which is substantially transparent to light in the ultraviolet and/or visible region of the electromagnetic spectrum, said light concentrator comprising a rod and having a length and a width; said light concentrator having a light input region along its length, and a light output region along its length at a location spaced from the light input region; a plurality of light guides, each light guide having a light input end and a light output end; a plurality of light emitting diodes, one light emitting diode in juxtaposition with a light input end of one of the light guides and capable of emitting light into the light input end of the light guide to which it is juxtaposed; the light output end of each of said light guides abutting the light concentrator along its length at the light input region;
   ii) providing a photosensitive composition disposed on a substrate; and then
   iii) exposing the photosensitive composition by directing light in the ultraviolet and/or visible region of the electromagnetic spectrum from the light output region of the light concentrator to the photosensitive composition.

* * * * *